(12) United States Patent (10) Patent No.: US 7,774,817 B2
Gupta (45) Date of Patent: Aug. 10, 2010

(54) META DATA ENHANCED TELEVISION PROGRAMMING

(75) Inventor: Anoop Gupta, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1862 days.

(21) Appl. No.: 09/775,393

(22) Filed: Jan. 31, 2001

(65) Prior Publication Data

US 2004/0073947 A1 Apr. 15, 2004

(51) Int. Cl.
*H04N 7/16* (2006.01)
*H04N 5/445* (2006.01)
*H04N 7/173* (2006.01)
*G06F 3/00* (2006.01)
*G06F 13/00* (2006.01)

(52) U.S. Cl. .............................. 725/86; 725/25; 725/53

(58) Field of Classification Search .................... 725/32
See application file for complete search history.

(56) References Cited

U.S. PATENT DOCUMENTS

| | | | | |
|---|---|---|---|---|
| 5,027,400 A * | 6/1991 | Baji et al. | .................... | 725/116 |
| 5,717,468 A * | 2/1998 | Baryla | ......................... | 725/37 |
| 6,357,042 B2 * | 3/2002 | Srinivasan et al. | ............. | 725/32 |
| 6,400,996 B1 * | 6/2002 | Hoffberg et al. | .............. | 700/83 |
| 6,438,566 B1 * | 8/2002 | Okuno et al. | ................ | 715/233 |
| 6,473,903 B2 * | 10/2002 | Balakrishnan et al. | ....... | 725/135 |
| 6,484,156 B1 | 11/2002 | Gupta et al. | | |
| 6,493,872 B1 * | 12/2002 | Rangan et al. | ................. | 725/32 |
| 6,557,042 B1 | 4/2003 | He et al. | | |
| 6,581,207 B1 * | 6/2003 | Sumita et al. | ................. | 725/46 |
| 6,598,228 B2 * | 7/2003 | Hejna, Jr. | ..................... | 725/91 |
| 6,601,238 B2 * | 7/2003 | Morrison et al. | .............. | 725/50 |
| 6,625,812 B2 * | 9/2003 | Abrams et al. | .............. | 725/105 |
| 6,631,359 B1 * | 10/2003 | Braitberg et al. | .............. | 705/50 |
| 6,684,249 B1 * | 1/2004 | Frerichs et al. | ............. | 709/225 |
| 6,718,551 B1 * | 4/2004 | Swix et al. | ..................... | 725/32 |
| 6,829,781 B1 * | 12/2004 | Bhagavath et al. | ............ | 725/94 |
| 7,039,932 B2 * | 5/2006 | Eldering | ....................... | 725/35 |
| 7,055,166 B1 * | 5/2006 | Logan et al. | ................... | 725/32 |
| 7,194,511 B2 * | 3/2007 | Stettner | ...................... | 709/205 |
| 7,236,969 B1 * | 6/2007 | Skillen et al. | .................. | 707/3 |
| 2001/0023436 A1 * | 9/2001 | Srinivasan et al. | .......... | 709/219 |

(Continued)

OTHER PUBLICATIONS

David Bargeron et al., "Annotations for Streaming Video on the Web: System Design and Usage Studies," Proceedings of the Eighth International World Wide Web Conference, Canada, May 1999, 11 pages.

*Primary Examiner*—Christopher Kelley
*Assistant Examiner*—Justin E Shepard
(74) *Attorney, Agent, or Firm*—Perkins Coie LLP (57) ABSTRACT

A variety of meta data based enhancements to media content viewing are described, including making meta data corresponding to media content available for user searching and using meta data to identify highlight portions of the media content so that only the highlight portions need to be stored. Additionally, comments made to media content can be shared with other viewers of the content, even when viewing the content at different times and even when viewing different versions of the content. Furthermore, a synchronization point can be established for the media content and used by the client systems as a common reference location. In addition, advertisements for media content can be rendered based on how much time has been spent rendering the media content, as well as the amount of a fee paid by the user of the client system.

11 Claims, 9 Drawing Sheets

U.S. PATENT DOCUMENTS

2002/0078444 A1* 6/2002 Krewin et al. .................. 725/35
2002/0087562 A1* 7/2002 McAnaney et al. ......... 707/100
2002/0088000 A1* 7/2002 Morris ....................... 725/105
2002/0095674 A1* 7/2002 Lowthert et al. .............. 725/32

* cited by examiner

META DATA ENHANCED TELEVISION PROGRAMMING

TECHNICAL FIELD

This invention relates to storage and rendering of media content, and more particularly to meta data enhanced television programming.

BACKGROUND OF THE INVENTION

Televisions have become commonplace in homes throughout many countries and increasingly throughout the world. Viewing of television programming has traditionally taken the form of either "live" viewing (that is, viewing as the television program is being broadcast) or time delayed viewing. Video cassette recorders (VCRs) have been used for many years to record programs for delayed viewing. More recently, however, digital video recorders (DVRs) have become available that allow television programs to be stored digitally on a hard disk for delayed viewing.

DVRs have allowed some enhancements to be made to television program viewing, such as a pause feature to pause the playback of the television program while it is being broadcast (with the remainder of the program being stored to the hard disk for later viewing). However, these enhancements remain in the general category of time delayed viewing—the viewer is able to record and thus delay viewing of the remainder of the program until a later time.

In addition to viewing television programs, other media have been used to distribute programming. Video cassettes have been used for many years to distribute movies and other programming for playback in VCRs. Additionally, other media such as Digital Versatile Disks (DVDs) are becoming increasingly popular for distributing movies and other programming. While DVDs are typically capable of providing higher resolution images and higher quality audio than video cassettes, and allow for faster random accessing of portions of the programming, DVD players typically do not provide much more in the way of enhanced functionality than is available from VCRs.

Despite these advances in recording devices and audio/video storage technology, there remains a need to expand on the television viewing enhancements available to users. The invention described below addresses these needs, providing meta data enhanced television programming.

SUMMARY OF THE INVENTION

Meta data enhanced television programming is described herein.

In accordance with one aspect, meta data associated with media content is made available for user-searching. The user can enter search criteria and have rendered to him or her one or more portions of the corresponding media content that match the search criteria.

In accordance with another aspect, meta data associated with media content is used to conserve storage space used for storing the media content. Highlight portions of the media content are identified in the meta data and only those highlight portions of the media content are saved. The identification can be performed as the media content is received, resulting in the non-highlight portions not being saved, or all of the media content may be initially saved and the non-highlight portions subsequently deleted.

In accordance with another aspect, meta data associated with media content is used to identify highlight portions of the media content. Different meta data sources may be available from which different highlight portions can be identified. For example, the media content may be a baseball game and different meta data sources may identify different portions of the baseball game as highlights (e.g., there may be a pay-for-use service from which identified highlights can be received for a fee, and there may be a free service from which other identified highlights can be received). The user can then view the highlight portions, as identified by one or more of the meta data sources, thereby allowing the user to watch the baseball game for a shorter amount of time that is necessary to watch the entire game but at the same view the most important parts of the baseball game.

In accordance with another aspect, comments to media content can be entered and saved by multiple different viewers of the content. These comments are then made available to subsequent viewers when viewing the content. The comments can be added regardless of whether the viewers view the content concurrently or at different times, and regardless of whether the viewers view the same version of the content (e.g., from the server or DVD) or different versions (e.g., some viewing a version from a server with others viewing a version from a DVD).

In accordance with another aspect, a synchronization point is established for media content. This synchronization point is after the beginning of the media content and is used by client systems as a common reference location to identify offsets for comments and/or other meta data.

In accordance with another aspect, advertisements for media content are rendered based on how much time has been spent viewing the media content. If greater than a threshold amount of time elapses without an advertisement being rendered, one or more advertisements are rendered on the client system. The number of advertisements can also vary, based on the amount of a fee paid by the user of the client system.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

Figure 1:
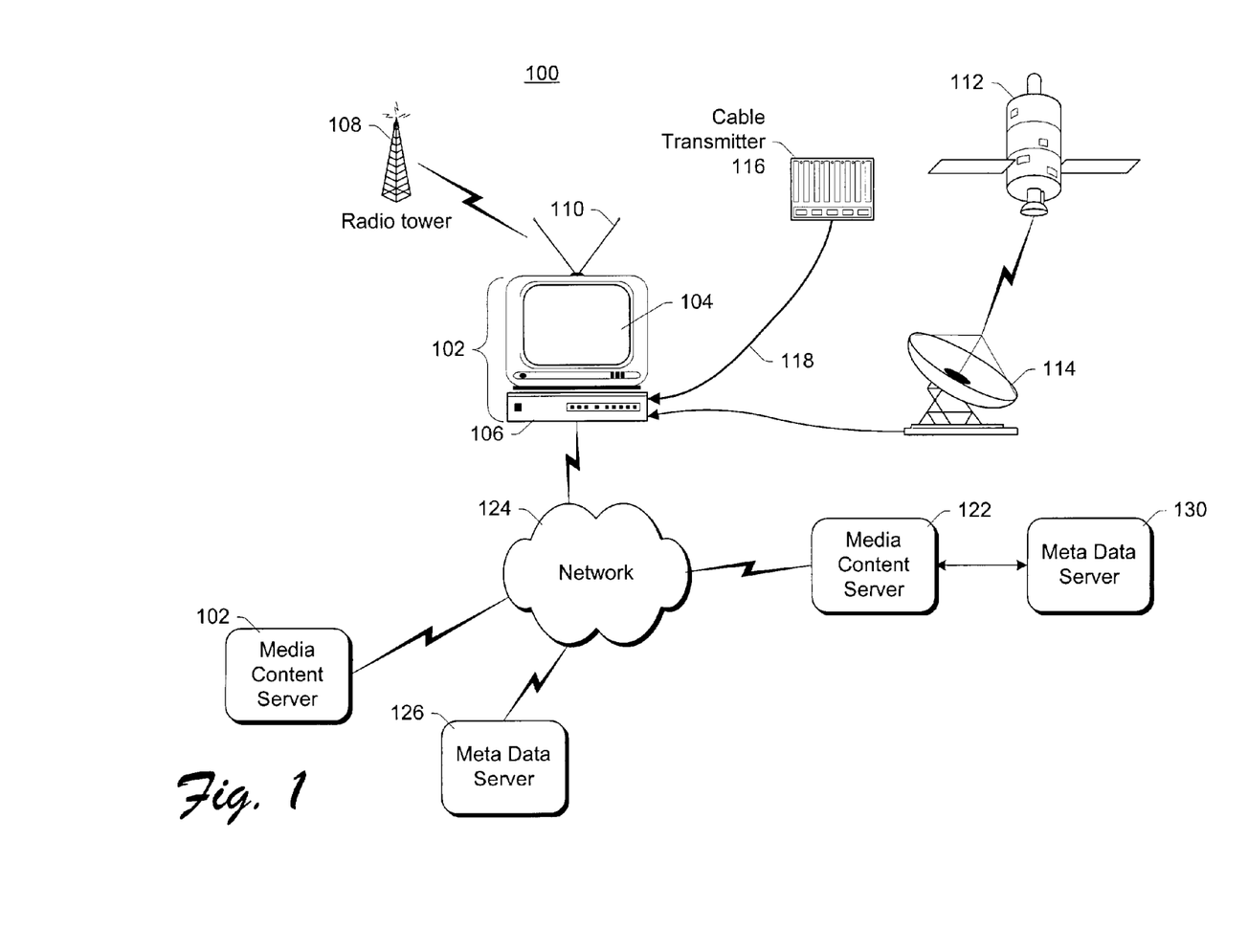
FIG. 1 shows an exemplary content distribution and viewing system in accordance with certain embodiments of the invention.

FIG. 1 shows an exemplary content distribution and viewing system 100 in accordance with certain embodiments of the invention. Entertainment system 100 includes a client media content rendering system 102 having a display device including a viewing area 104 and a receiver 106. Media content rendering system 102 represents any of a wide variety of devices for rendering video and/or audio content as well as other types of media content, such as text, graphics, animation, etc. System 102 can be, for example, a personal computer, a gaming console and television, other types of computing devices, etc. Receiver 106 is connected to receive and render media content from multiple different programming sources. Receiver 106 may also include a storage device (e.g., magnetic and/or optical disks) to store received media content (also referred to as programming) prior to rendering on system 102. Media content can be rendered individually or alternatively multiple types of media content can be rendered concurrently (e.g., a multimedia presentation). Additionally, media content can be delivered to receiver 106 in its entirety (e.g., an entire program) before rendering begins, or alternatively rendering may begin prior to receiving the entirety of the content (e.g., streaming media content). Receiver 106 may be combined with a display device into a single component (e.g., a personal computer or television), or alternatively receiver 106 and display device may be separate components.

FIG. 1 shows several different physical sources of programming, including a terrestrial television broadcasting system 108 which can broadcast analog or digital signals that are received by antenna 110; a satellite broadcasting system 112 which can transmit analog or digital signals that are received by satellite dish 114; a cable signal transmitter 116 which can transmit analog or digital signals that are received via cable 118; and networked media content servers 120 and 122 which can each transmit digital signals that are received via a communications network 124. System 102 can be coupled to network 124 via any of a wide variety of conventional components (e.g., by a modem, router, etc.). Both analog and digital signals can include audio, video, and/or data content. Other programming sources might also be used in different situations, including interactive television systems.

In one implementation, analog signals are encoded upon receipt by the receiver 106 in order to put the signals into a computer friendly digital form. Alternatively, some or all analog signals may be rendered without conversion to digital form.

Additional network(s) may also be involved in the distribution of programming to system 102. By way of example, system 102 may be included as part of a home network (not shown), with the programming being stored at a server (not shown) prior to transmission to system 102.

Typically, audio, video, and any other content for a particular program (or portion thereof) will be transmitted from the same source (e.g., all of the content for a particular movie may be received from cable transmitter 116). Alternatively, the audio, video, and any other content for a program may be transmitted from multiple sources (e.g., the audio and video content may be received from cable transmitter 116, while text and animation content is received from content server 120).

System 102 is also optionally coupled to meta data server 126 via network 124. Meta data server 126 stores meta data corresponding to content available from one of the various programming sources. Meta data is generally data that describes other data, and in the illustrated example the meta data describes its corresponding media content. The meta data can be, for example, comments, annotations, highlight identifications (e.g., identified portions of a baseball game), and so forth as discussed in more detail below. Meta data servers may be standalone servers such as server 126, or alternatively coupled directly to a content server such as meta data server 130 coupled to content server 122.

Communications network 124 can be any of a variety of networks, including a public network (e.g., the Internet), as well as a private network (e.g., a corporate local area network (LAN) or wide area network (WAN)), or combinations thereof. Communications network 124 can be implemented in any of a variety of different manners, including wired and/or wireless communications media.

Communication over network 124 can be carried out using any of a wide variety of communications protocols. In one implementation, network 124, system 122, and servers 120, 122, and 126 support the World Wide Web. The World Wide Web (also referred to as simply the "web") is a collection of documents (also referred to as "web pages") that users can view or otherwise render and which typically include links to one or more other pages that the user can access. Communications using the World Wide Web can be in accordance with the Hypertext Transfer Protocol (HTTP), in which World Wide Web pages are written in a markup language, such as the Hypertext Markup Language (HTML) or the eXtensible Markup Language (XML).

Figure 2:
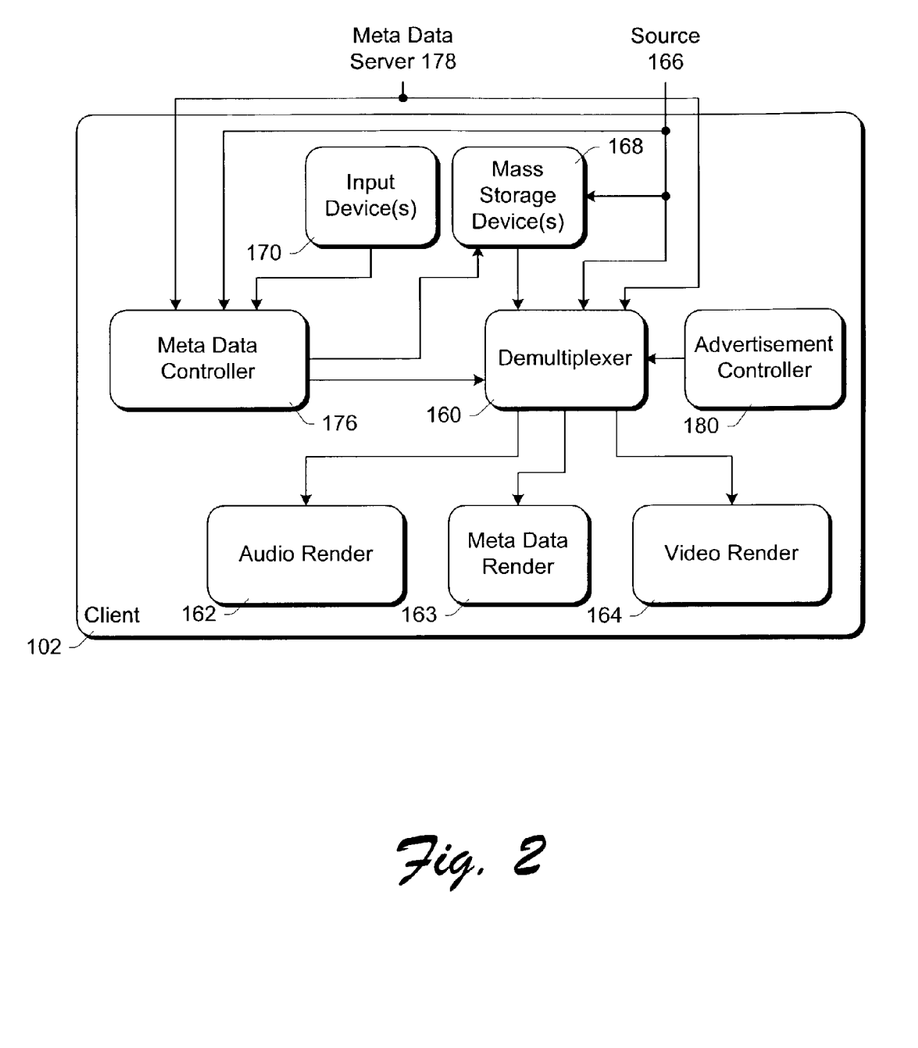
FIG. 2 is a block diagram illustrating an exemplary media content rendering system in accordance with certain embodiments of the invention.

FIG. 2 is a block diagram illustrating an exemplary media content rendering system 102 in accordance with certain embodiments of the invention. Media content to be played back on client media content rendering system 102 is received at a demultiplexer 160, which separates the media content into separate content streams and forwards the content streams to appropriate rendering components to render the content. In the illustrated example, demultiplexer 160 separates the media content into an audio stream that is forwarded to audio renderer 162 and a video stream that is forwarded to video renderer 164. Audio renderer 162 plays the audio (e.g., via speakers) of system 102, while video renderer 164 plays the video data (e.g., via a display device). Meta data that is to be rendered to a user may also be received at demultiplexer 160 and forwarded to meta data renderer 163 for rendering. The operation of meta data renderer 163 varies depending on the type of meta data (e.g., audio meta data may be played via speakers while video data may be played via the display device). Alternatively, rather than receiving combined content that is separated into multiple streams, client system 102 may receive content separately (e.g., as separate streams) that can be input to the appropriate renderer(s) directly without being demultiplexed by system 102.

The media content can be received at demultiplexer 160 from an external source(s) 166 or alternatively a local storage device(s) 168. External source 166 can be any of a wide variety of conventional programming sources, such as those sources discussed above with reference to FIG. 1, a computing device, a digital audio and/or video recorder, a video camera, etc. Local mass storage device 168 can be a writeable device (e.g., a writeable DVD or magnetic hard disk) that receives media content from another source (e.g., external source 166) and stores it locally for subsequent viewing, or alternatively a read-only device (e.g., non-writeable DVD). Additionally, storage device 168 may include fixed storage media (e.g., a typical magnetic hard disk drive) and/or removable storage media (e.g., a DVD).

Client system 102 also includes a meta data controller 176 coupled to receive meta data from an external meta data server 178 (e.g., server 126 or 130 of FIG. 1). Additionally, some distributed media (e.g., DVDs) may include meta data for the media content stored on the media, allowing controller 176 to receive meta data from the media (e.g., storage device 168). All of the meta data corresponding to particular media content may be obtained from the same source (e.g., the same server), or alternatively multiple different sources (e.g., multiple servers, a local storage device and a remote server, etc.).

The meta data received by controller 176 can include any of a wide variety of information regarding the corresponding media content. The exact nature of the meta data will vary, depending on the corresponding media content and the intended or desired use of the meta data. Examples of meta data include index information (identifying particular temporal locations of the media content for particular subjects), segmentation information (classifying temporal portions of the media content), highlight information (which portions are highlight portions, a relative importance of portions, etc.), comments or annotations, etc. The meta data can include data that is intended for rendering to the user, or that which is not intended for rendering to the user. If the meta data is to be rendered, controller 176 communicates the meta data to renderer 163 either indirectly via demultiplexer 160 or alternatively directly.

The meta data associated with particular media content can be received in a variety of different manners. In one implementation, when media content is requested from a content source, the content source communicates with the meta data server to obtain the meta data associated with the requested media content. The meta data server can then communicate the meta data directly to the requesting client, or alternatively to the requesting client via the media content source.

In another implementation, meta data controller 176 communicates a request to the meta data server for meta data associated with identified media content. If multiple servers 178 exist, controller 176 may need to be informed of which one to access for the meta data (e.g., a default server associated with the client system 102, an indication given from the source of the media content, an indication embedded in the media content, etc.). Controller 176 passes an identifier of the media content to server 178 that uniquely identifies the content, such as a title and producer (or release date) of the content, an assigned globally unique ID (GUID), etc. If any meta data is available for the media content, that meta data is returned from server 178 to controller 176.

The meta data may be communicated to controller 176 as a group and controller 176 determine when the meta data is to be rendered (if at all), such as by comparing the temporal location(s) of the meta data to the current location of the media content being rendered. Alternatively, the meta data may be communicated to controller 176 as it is needed and rendered or otherwise used upon receipt (e.g., comment server 178 may be in communication with the source of the media content to know the current location of the media content being communicated to client system 102, or demultiplexer 160 to know the current location of the media content being presented to renderers 162 and 164).

Meta data controller 176 can optionally store the received meta data at client system 102. The meta data can be stored, for example, in volatile storage (e.g., system RAM) or nonvolatile storage (e.g., mass storage device 168).

Meta data can be generated during the broadcast of a program (e.g., during a "live" event), or alternatively afterwards (e.g., the program may be stored in its entirety and meta data added based on the stored version). Meta data can be made available from any of a wide variety of sources. Examples of such sources include third-party professionals (e.g., individuals or groups that index or identify highlights based on their expertise and optionally charge individuals for access to the meta data), broadcasters (e.g., the source of the media content), "regular" viewers (e.g., a group of viewers may be able to vote (e.g., a scale from 1-10) on how important particular portions of the content are and store the compiled votes as meta data), or machine-generated (e.g., automatic identification of which portions are more important, such as based on the presence of excited speech, bright lighting, etc.).

In certain embodiments, meta data controller 176 also makes the meta data available for user-searching. The meta data available for user-searching can be intended for rendering to the user or alternatively not for rendering to the user (e.g., intended only for searching). Client system 102 also includes zero or more input devices 170, via which the user can input search criteria to controller 176. Upon receipt of the search criteria, controller 176 compares the search criteria with the meta data. Exact matches may be required, or alternatively well-known wildcards may be used in the matching process.

If controller 176 identifies any matches between the search criteria and the meta data, appropriate action is taken. This appropriate action can vary, and can be a default course of action, can be a course of action previously identified by the user, can be a prompt to the user for which of multiple actions to take, etc. In one implementation, two different courses of action can be taken: the user can jump to the location in the media content that corresponds to the match, or the user can play back one or more portions of the media content that correspond to the match.

By way of example, particular media content may be a baseball game and the meta data may include various aspects about the game and corresponding temporal locations in the game, such as the temporal locations for each inning, each hit, each homerun, each stolen base, each player at bat, each pitcher, etc. The user can then subsequently search the meta data with particular search criteria, such as a particular player's name. The user can then request playback of all portions of the media content with which the particular player's name is associated (e.g., each temporal range when the identified player is at bat).

Meta data controller 176 can further be used to conserve storage space in system 102. For example, storage device 168 has a limited amount of storage space, and situations may arise where the user of client system 102 has requested that more content be stored than there is available storage space. Such situations can be resolved by limiting the media content that is stored in storage device 168 based on the corresponding meta data. Meta data can include an indication of which portions of the media content are "highlights"—that is, which portions are perceived or expected to be perceived as the most important portions. This can be a variable amount (e.g., the user may request that the highlights comprise 20% of the media content, resulting in the 20% most important (or expected to be most important) portions being identified). Alternatively, this can be a fixed amount (e.g., the author(s) of the meta data may simply identify which portions are highlights and which portions are not highlights without regard for how much of the media content is identified as highlights).

Meta data controller 176 uses these highlight indications to determine which portions of the media content are stored on storage device 168. Only those portions which are highlights are kept on device 168—other portions are not. In one implementation, controller 176 performs the analysis "on the fly"—as the portions are received controller 176 checks the associated meta data to determine if they are highlights, stores them to device 168 if they are highlights, and drops them if they are not highlights. In another implementation, controller 176 performs the analysis after the fact. All of the media content (or at least some of the media content) is initially saved to device 168. After the media content is saved, controller 176 analyzes the associated meta data to determine which portions are highlights and deletes those portions that are not highlights from device 168.

When maintaining only certain portions of the media content rather than all of the content, care should be taken to ensure that a proper record of the offsets into the original media content are maintained. For example, if the highlights of a ten-minute program are only minutes five through seven, then a record should be kept that thirty seconds into the highlight portion is actually five minutes and thirty seconds into the media content. This allows consistency to be maintained for comments and/or other meta data. Maintaining such a record can be accomplished, for example, by maintaining a mapping from the offsets into the highlight portions to the offsets into the original media content.

Another example of meta data is comments or annotations that are added by users to which the corresponding media content is rendered. Meta data controller 176 optionally allows a user to input, via input device(s) 170, comments regarding media content being rendered at system 102. These comments can be in any of a variety of formats, such as textual (via a keyboard), audio (via a microphone), etc.

When a comment is received from a user of system 102, meta data controller 176 records the comment as well as an indication of a location of the media content that the comment corresponds to. The media content has a timeline associated with it so that temporal locations of the content can be identified. The timeline can directly identify time (e.g., a number of minutes and seconds) or alternatively indirectly identify time (e.g., a number of "units", where units can be any desired measure such as data frames, number of bytes, etc.). Comments can correspond to a single temporal location of the media content or alternatively a range of temporal locations. The location(s) that a comment corresponds to can be identified in a variety of manners, such as by the user manually identifying a particular location(s), based on when the user selects a particular command (e.g., "add comment", "create comment", etc.), etc.

Upon receipt of a comment, meta data controller 176 records the temporal location(s) of the comment (referenced to a synchronization point, as discussed in more detail below) and either saves the comment locally or forwards the comment to a remote meta data server. Controller 176 may forward comments to the remote meta data server as they are received, or alternatively store multiple comments locally before forwarding the multiple comments to the remote server. Controller 176 forwards the comments it receives to a remote meta data server 178. Server 178 stores the received comments and makes them available to other viewers. Such other viewers can be playing the same media content at the same time (thereby allowing a discussion regarding the media content to evolve) and/or at a subsequent time (thereby allowing a subsequent viewer(s) to benefit from a previous discussion). Alternatively, such other viewers may retrieve and render the comments separately from the media content (e.g., someone who has already watched the content may desire to skim through the comments but not watch the media content again).

Alternatively, some comments may be stored locally at client 102, such as on mass storage device 168. Examples of comments that a user may desire to store locally are private or personal comments for particular content. For example, a user may add comments to one of his or her home movies and have those comments stored locally on device 168.

Meta data controller 176 also manages the rendering of comments on client system 102. When the user is rendering media content, meta data controller 176 accesses remote server 178 to determine whether there are any comments corresponding to the media content.

In the illustrated example, controller 176 forwards comments to demultiplexer 160 which communicates the comments to renderer 163. Alternatively, controller 176 may forward the comments directly to renderer 163.

Figure 3:
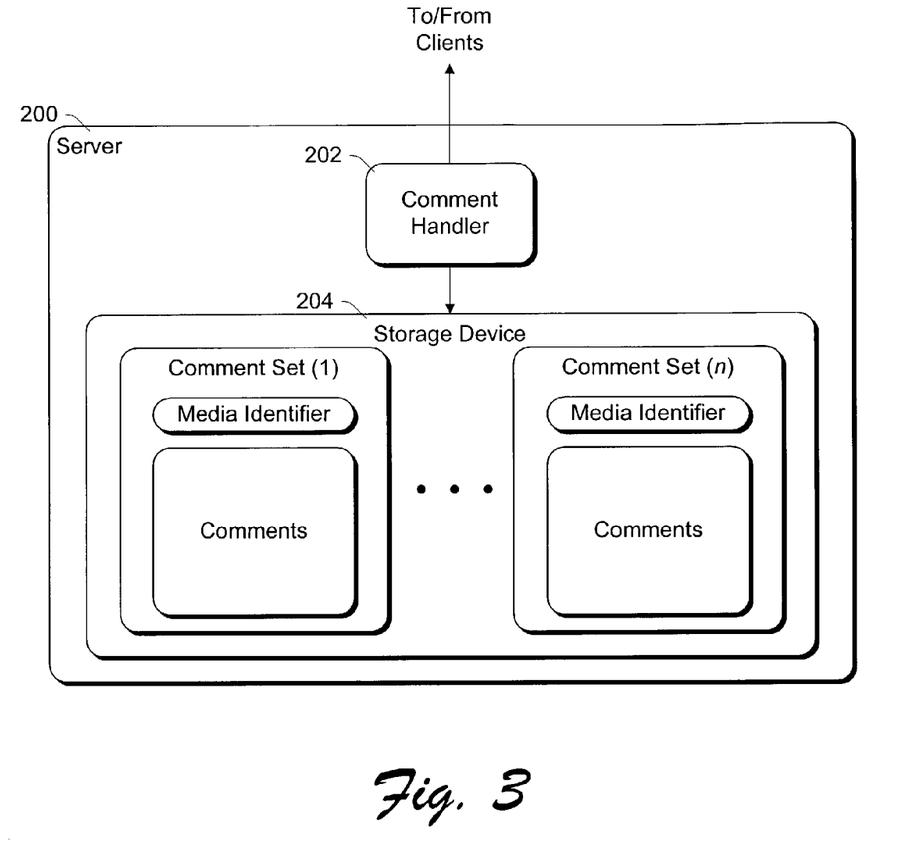
FIG. 3 illustrates an exemplary meta data server such as may be used in accordance with certain embodiments of the invention.

FIG. 3 illustrates an exemplary meta data server such as may be used in accordance with certain embodiments of the invention. FIG. 3 is discussed primarily with reference to meta data that includes comments, although other types of meta data may also be included. Server 200 includes a comment handler 202 and a storage device 204. Comment handler 202 manages the receipt of comments from and the transmission of comments to client systems (e.g., client system 102 of FIG. 2). Storage device 204 maintains comments for multiple (n) comment sets, each corresponding to particular media content (e.g., a particular television program, a particular movie, etc.). Each comment set includes an identifier of the media content corresponding to the comment set as well as the comments themselves. Alternatively, a separate record of the media content identifiers may be maintained with identifiers of (e.g., pointers to) the associated comments.

When a new comment is received from a client system, comment handler 202 receives the new comment, identifies (based on the media identifiers) the appropriate comment set, and adds the comment to the appropriate comment set. Handler 202 also stores, as part of the comment, an identifier of the temporal location of the media content corresponding to the comment, and optionally an identifier of the user that made the comment. Similarly, when a client system requests comments corresponding to particular media content, comment handler 202 identifies the appropriate comment set based on the media content identifier and forwards the comments in the comment set to the requesting client system.

Comment handler 202 may also limit access to particular comment sets. A coordinating user (the identity of which may vary per comment set) may optionally identify a group of one or more individuals that are allowed to access a particular comment set. The individuals can be identified in any of a variety of manners, such as by network address of their corresponding client systems, by user name, by user ID and password, etc. Only those individuals identified by the coordinator are allowed to access the comments in the comment set. In such situations, when comment handler 202 receives a request for comments, comment handler 202 further verifies that the requestor is entitled to access the comment set. If so, then the comments are returned to the requester; if not, the comments are not returned to the requester. Similarly, only the identified users are able to add comments to the set. Any comments received from a user that is not entitled to add comments are ignored by handler 202. Note also that different groups may be identified for comment sets, such as one group identifying users allowed to read the comments and another group identifying users allowed to add new comments.

An example of limiting access to comment sets is in the classroom setting. A teacher may assign students to watch particular media content and add comments about it. The teacher communicates with comment handler 202 to limit comments to be viewed and added only by the students in the class, thereby limiting the discussion (in the comments) to those students that are in the class.

Server 200 may also store other types of meta data. For example, comment handler 202 may also manage the storage and retrieval of other types of meta data, such as highlight indications. These highlight indications can be stored in a manner analogous to the storage of comments. For example, highlight indications from different sources (such as one or more subscription sources/services and one or more free sources/services) can be stored with an identifier of the media content corresponding to the highlight indications. Handler 202 may restrict the retrieval of such highlight indications (e.g., a user id and password may be required for the user to prove that he or she is authorized to access highlight indications from a subscription service, or access to some of the highlight indications may be prohibited until payment is received (e.g., charge to a credit card or other account)).

Returning to FIG. 2, different versions of media content can be available for rendering to the user of client system 102. Different versions of media content refer to different storage and/or presentation formats. Examples of different versions of media content include: DVD, VHS, DV (Digital Video), ASF (Advanced Streaming Format), MPEG-2 (Moving Pictures Experts Group-2), MPEG-4, etc. These different versions of media content can have the same meta data (e.g., comments by viewers) consolidated so that one viewer can benefit from the meta data even if a different version of the content is being viewed than the version that was viewed when the meta data was created.

In order to make meta data corresponding to media content more useful, it is important to have the correct location of the meta data identified (e.g., so a comment played back by different users is played back at the same time with reference to the corresponding media content). Unfortunately, different versions of the media content can be set up differently. For example, one version of a movie may have playback of the first title screen five seconds after the "beginning" of the version (the first data of the stored version), while another may have playback of the first title screen ten seconds after its beginning. Thus, using the beginning of the media content as a reference point for meta data would be confusing, because thirty seconds into one of the versions corresponds to different media content being rendered than thirty seconds into the other version.

This problem can be resolved by establishing a synchronization point that all meta data is referenced to. Thus, rather than referring to meta data as being offset from the beginning of the media content, the meta data is referred to as being offset from the synchronization point. The synchronization point may be, for example, three seconds or twelve seconds after the beginning of the media content that is rendered (e.g., after the first title screen of a movie).

The synchronization point can be identified in a variety of different manners. In one implementation, the source of the media content communicates an indication of the synchronization point, which can be, for example, a data byte (or packet or some other unit) including a flag identifying the point, a watermark in one or more audio and/or video frames that can be recognized by the client but is not perceptible to a user when rendered, a particular audio and/or video frame(s) having certain characteristics (e.g., 30% of the pixels are orange, 28% of the pixels are green, and 16% of the pixels are purple), etc. The synchronization point identifier can be embedded in the media content (e.g., an invisible or inaudible flag or watermark, or a particular frame having certain characteristics), or alternatively the synchronization point identifier can be inserted into the media content stream by the source (e.g., an indication may be provided during the vertical blanking interval (VBI)). Alternatively, the synchronization point identifier can be inserted into a different stream, such as one available via a different channel that the client can tune to.

In another implementation, the synchronization point for media content is agreed upon (or simply stated, such as by the author of the content) and distributed, publicly posted, or otherwise made available to those interested in it. Such an agreed upon or stated synchronization point can be, for example, a frame of audio or video that includes particular data, such as the first frame of a title page (e.g., a page identifying the producer of the film, the title of the film, etc.).

Additionally, one or more reference points may also be used to identify the synchronization point. For example, situations can arise where the client system does not receive the identifier of the synchronization point, such as if the synchronization point is fifteen seconds after the start of the version but the client system does not actually contact the remote source and start receiving the media content until ten minutes after it started. Reference points are additional identifiers of the synchronization point, indicating, for example, how long ago the synchronization point was. Reference points can be identified in any of the same manners as synchronization points, and can be established at regular and/or irregular intervals of the media content. For example, a particular television broadcast may have a reference point one minute after the start of the broadcast that identifies the synchronization point as having occurred thirty seconds ago.

Figure 4:
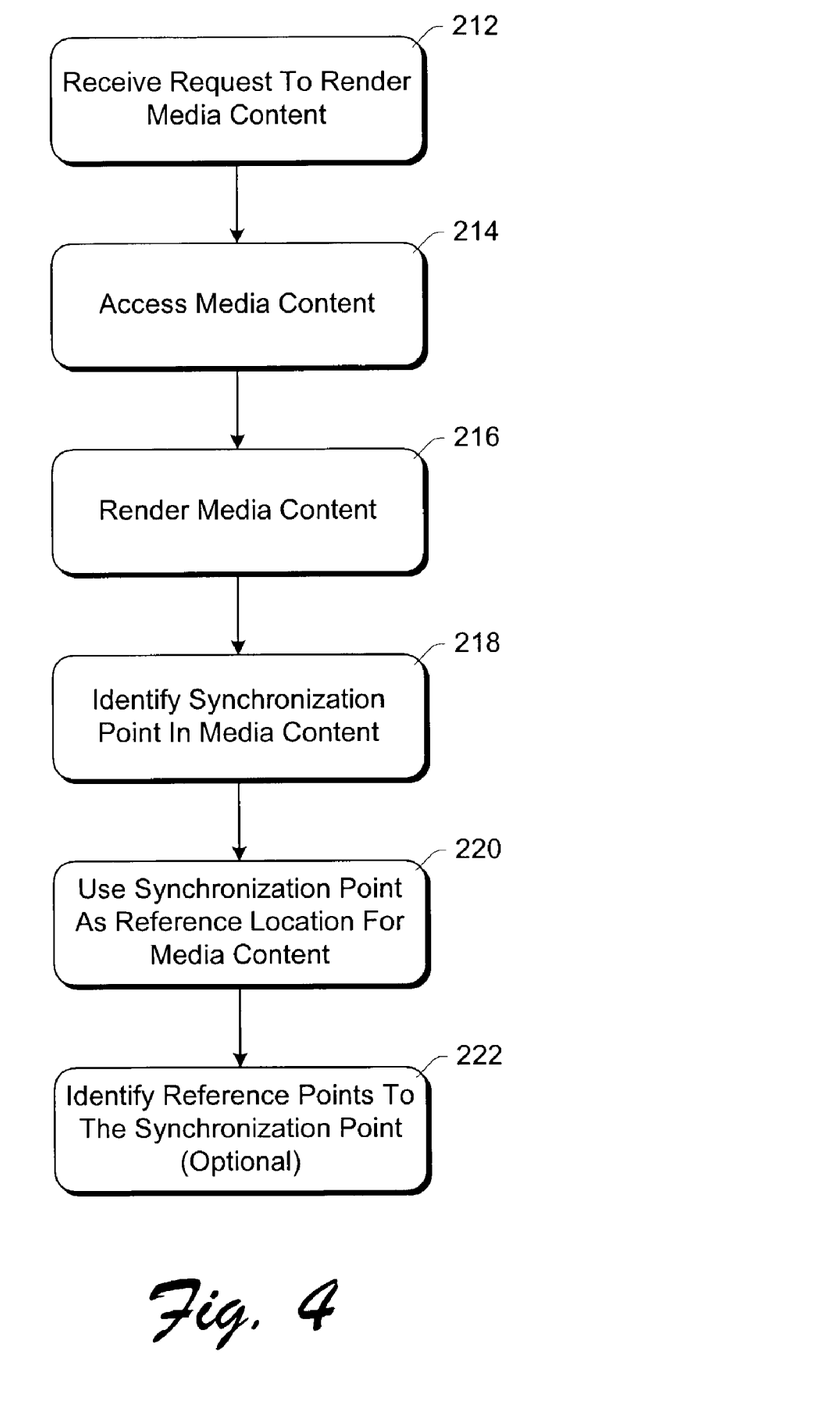
FIG. 4 is a flowchart illustrating an exemplary process for using synchronization points in accordance with certain embodiments of the invention.

FIG. 4 is a flowchart illustrating an exemplary process for using synchronization points in accordance with certain embodiments of the invention. The process of FIG. 4 is carried out by a client system 102, and may be implemented in software.

Initially, a request to render media content is received, such as from a user (act 212). Such a request could be, for example, entry of an identifier of the content, selection of a particular channel, insertion of a DVD, etc. The requested media content is accessed (act 214) and rendered (act 216). The appropriate synchronization point is identified in the media content (act 218) and is used as the reference location for the media content (act 220). Reference points to the synchronization point may also optionally be identified (act 222), in order to verify the synchronization point identified in act 218, in the event identification of the synchronization point in act 218 fails, etc.

Figure 5:
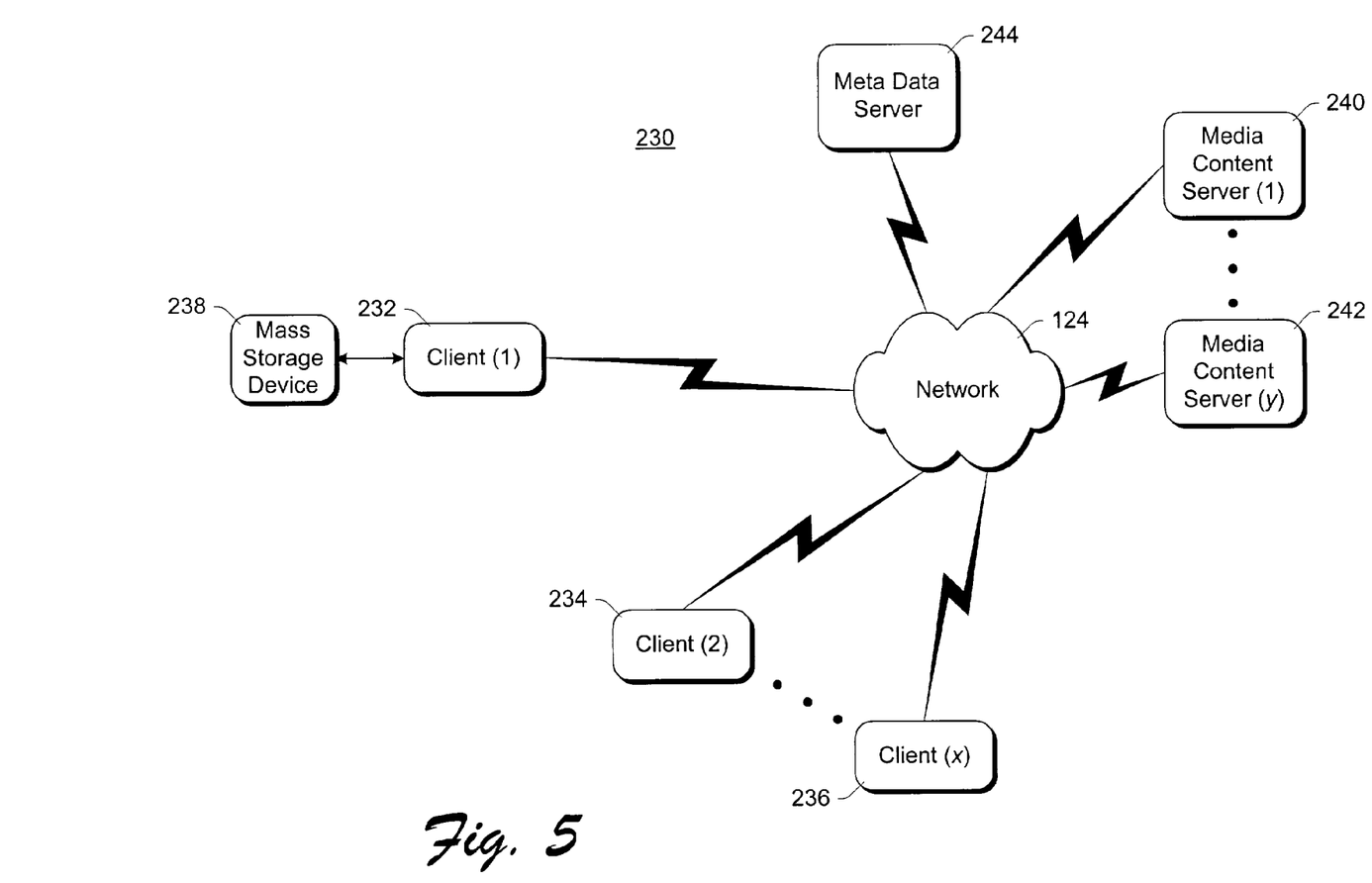
FIG. 5 is a block diagram illustrating a multi-user media content commenting environment in accordance with certain embodiments of the invention.

By identifying a common synchronization point to be used by all of the client systems rendering particular media content, meta data can be added by users that refer to the same temporal locations of all versions of the media content. FIG. 5 is a block diagram illustrating a multi-user media content commenting environment in accordance with certain embodiments of the invention. In the network environment 230, multiple client systems 232, 234, and 236 are coupled to network 124. Each of the client systems 232-236 may be, for example, a client system 102 of FIG. 2. In the illustrated example, the users of each of client systems 232-236 can access the same media content but different versions of the content. For example, the user of client system 232 may access the media content from a local storage device 238 (e.g., DVD), while the user of client system 234 may access the media content from content server 240 and the user of client system 236 may access the media content from content server 242.

The users of client systems 232-236 can access their respective versions of the media content at the same time, different times, overlapping times, etc. However, regardless of the time that the media content is accessed, each client system 232-236 accesses meta data server 244 to obtain any meta data (e.g., comments) from previous (or concurrent)

users. Similarly, any comments or other meta data added by the users of clients 232-236 are added to server 244 and are played for any subsequent (or concurrent users). Thus, server 244 provides a consolidation location for all of the viewers of the media content regardless of which version the viewers are playing.

Figure 6:
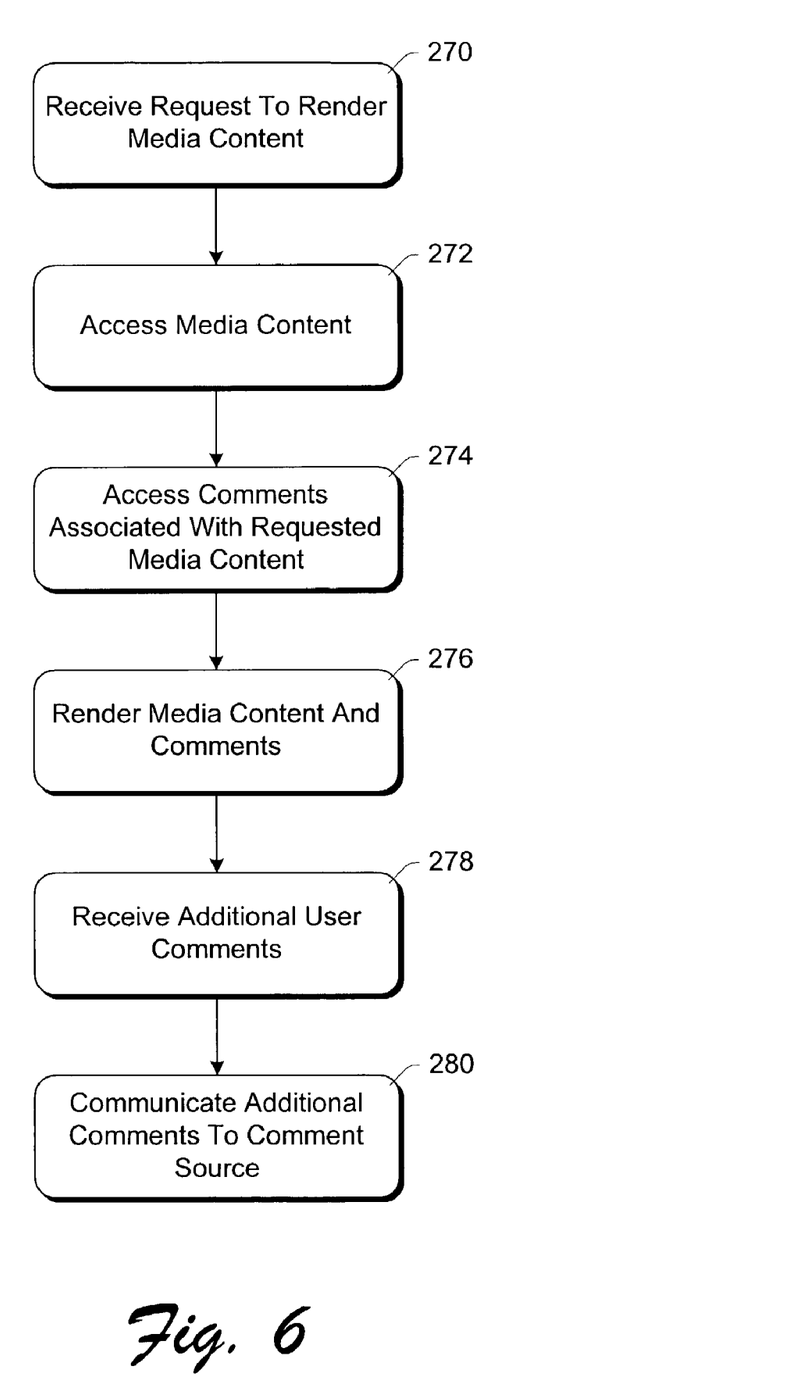
FIG. 6 is a flowchart illustrating an exemplary process for using comments in accordance with certain embodiments of the invention.

FIG. 6 is a flowchart illustrating an exemplary process for using comments in accordance with certain embodiments of the invention. The process of FIG. 6 is carried out by a client system 102, and may be implemented in software.

Initially, a request to render media content is received, such as from a user (act 270). Such a request could be, for example, entry of an identifier of the content, selection of a particular channel, insertion of a DVD, etc. The requested media content is accessed (act 272) as are comments associated with the requested media content (act 274). The requested media content and comments are then rendered (act 276). Additional comments may also be received from a user during rendering (act 278), and these comments are returned to the source of the comments (e.g., a comment server) for the media content (act 280) for storage.

Figure 7:
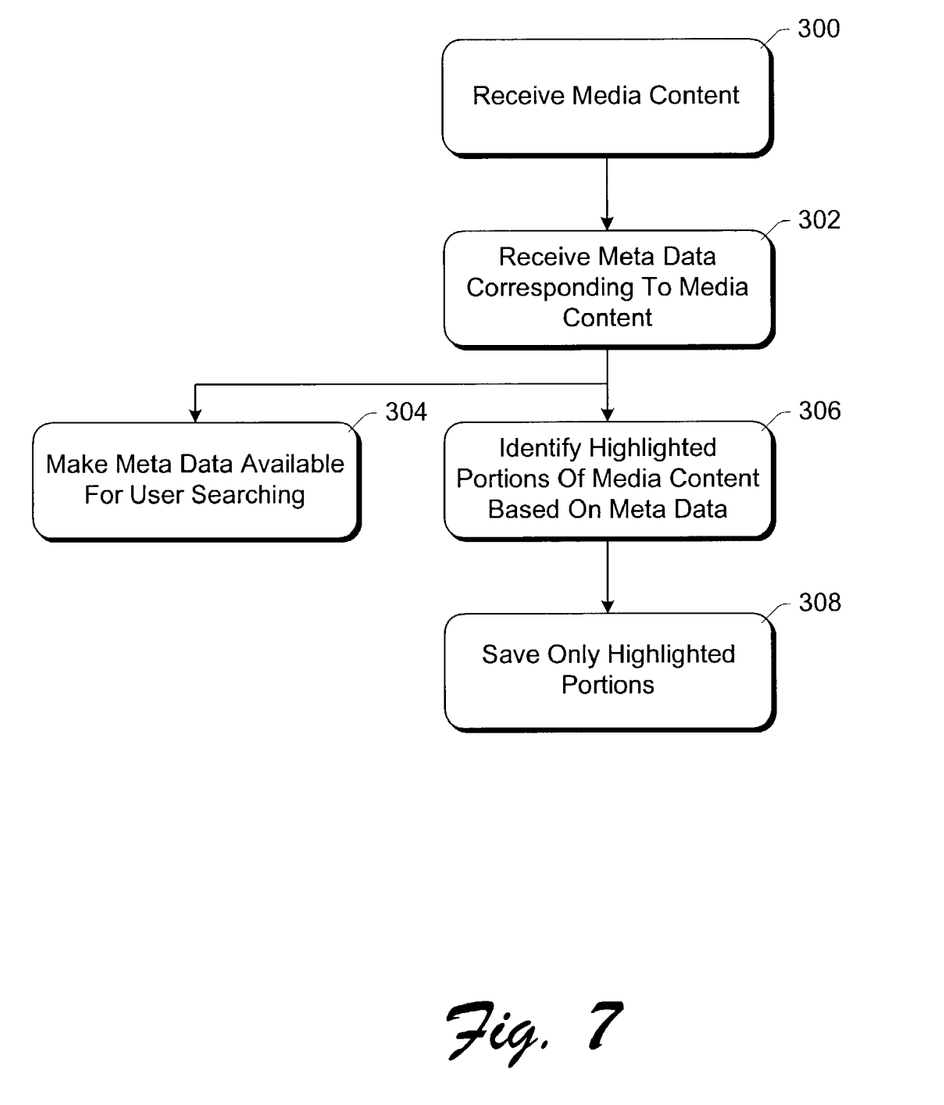
FIG. 7 is a flowchart illustrating an exemplary process for meta data based browsing and storage in accordance with certain embodiments of the invention.

FIG. 7 is a flowchart illustrating an exemplary process for meta data based browsing and storage in accordance with certain embodiments of the invention. The process of FIG. 7 is carried out by a client system 102, and may be implemented in software.

Initially, media content is received at the client system, such as in response to a user request (act 300). Such a request could be, for example, entry of an identifier of the content, selection of a particular channel, insertion of a DVD, etc. Meta data corresponding to the media content is also received (act 302) and made available for user searching (act 304). Additionally, highlighted portions of the media content are optionally identified based on the meta data (act 306) and only those highlighted portions are saved (act 308), thereby conserving local storage space.

Returning to FIG. 2, client system 102 also includes an advertisement controller 180. Advertisement controller 180 monitors the rendered media (e.g., as communicated by demultiplexer 160, or as rendered by renderers 162, 163, and/or 164) and determines when it is appropriate to render advertisements or commercials. The advertisements to be rendered can be received from an external source (e.g., source 166) or a local source (e.g., storage device 168). Client system 102 includes an advertisement controller to compensate for situations where advertisements may be skipped, such as when advertisements are not identified as highlights and thus are not saved on storage device 168. Additionally, some clients 102 may allow the user to fast forward fifteen or thirty seconds (common amounts of time for advertisements) and thus easily skip over advertisements.

In the illustrated example, advertisement controller 180 relies on being able to know what media content is being rendered. Controller 180 can obtain such information in a variety of manners. In one implementation, the source of the content communicates an identifier of the media content (e.g., a title and producer, a serial number uniquely identifying the content, etc.) to client system 102. This identifier may be communicated multiple times during delivery of the media content, accounting for situations where a user begins viewing content after it has begun (e.g., half-way through a movie). In another implementation, controller 180 accesses an electronic programming guide (e.g., stored locally or remotely) and, based on the channel the client system is tuned to, the current time, and the location of the client system (e.g., based on zip code input by the user), and looks up an identifier of the media content from the electronic programming guide based on this information.

Advertisement controller 180 has access to information identifying where advertisements are embedded in media content, if at all. This information can be included in the media content (e.g., a flag signaling an advertisement), may be inherent in the media content (e.g., ten minutes after the synchronization point, eighteen minutes after the synchronization point, etc.), may be identified in the meta data, etc. Advertisement controller 180 is also programmed with a threshold amount of time to use in determining when advertisements are to be rendered. This threshold amount of time can be programmed in any of a variety of manners, such as in response to a command from a source of the media content (this could be incorporated into the meta data associated with the media content, embedded within the media content itself, the subject of a separate communication, etc.). The threshold amount of time is established so that not greater than a certain amount of time passes between advertisements. The threshold amount of time can vary by content, and can optionally vary by portion of the content (e.g., a content broadcaster may prefer to have the first thirty minutes of a movie to be advertisement-free in order to get viewers hooked, then decrease the threshold (e.g., to fifteen minutes) towards the end of the movie).

Advertisement controller 180 monitors the media content being rendered and checks whether an advertisement has been rendered. An advertisement that is skipped over is not treated as being rendered. If an advertisement(s) is rendered then controller 180 resets a counter of the time since the last advertisement to zero. The total number of advertisements or cumulative duration of the advertisements rendered that are required in order to reset the time since the last advertisement can be programmed in controller 180, such as in response to a command from a source of the media content (analogous to the programming of the threshold amount of time discussed above). This number or duration can vary by content, and may also vary by portion of the content.

If the threshold amount of time elapses without an advertisement, controller 180 stops the rendering of the media content and inserts one or more advertisements. Once the inserted advertisements are rendered, the amount of time since the last advertisement is reset to zero and rendering of the media content continues until the threshold amount of time again elapses. Advertisement controller 180 monitors only the time that the media content is actually being rendered—if playback of the media content is paused, so too is the counting of elapsed time paused.

The advertisements rendered after the threshold amount of time has elapsed can be obtained from a local source (e.g., storage device 168) or alternatively a remote source (e.g., a remote server, which may be the same as or different from the source of the media content). Controller 180 may simply request advertisements from the server and then render whatever advertisements are received in response to the request, or alternatively controller 180 may select the advertisements to be rendered from a group of advertisements. This selection process can be based on any of a wide range of criteria, such as random selection, selecting the next advertisement in accordance with some pre-arranged ordering, attempting to identify (e.g., based on user preferences or viewing characteristics) which advertisements are most likely to be of interest to the viewer, etc.

Advertisement controller 180 can optionally track advertisement rendering over multiple rendering sessions of the media content. A rendering session refers to the range between beginning playback (e.g., by pressing a play button) and terminating playback (e.g., by pressing a stop button, a quit or exit button, etc.). Advertisement controller 180 can maintain a record (either locally or on a remote server) of the time since the last advertisement even after playback is terminated. If playback of the same media content (or a different version of that media content) is again begun, then controller 180 begins counting time since the last advertisement from the stored value. Using this stored value can be absolute (e.g., regardless of where in the media content the user begins playback), or alternatively variable (e.g., reset to zero or half of the stored value if the user begins playing the media content from the beginning again rather than from where he or she previously left off). For example, assume a user begins watching a movie and the threshold amount of time identifies that an advertisement should occur every fifteen minutes. If the user watches ten minutes of the movie and then stops playback, this time since the last advertisement (ten minutes) is stored by controller 180. If the user later begins watching the movie again (e.g., later that day, the next week, etc.), then controller 180 uses the value of ten minutes as the time since the last advertisement, so that five minutes after the user begins this second playback of the movie he or she will be presented with an advertisement(s) because the total elapsed time has been fifteen minutes.

The counter of the time since the last advertisement can indicate an absolute point where an advertisement should be rendered (e.g., simply stop rendering the current content at that point and render an advertisement instead). Alternatively, when the timer elapses a more intelligent approach may be taken to determining exactly when to render an advertisement. In one implementation, the meta data associated with the media content includes multiple advertisement preference points (e.g., indicated by the broadcaster or author of the content). After the timer elapses (or alternatively starting an amount of time prior to the timer elapsing), controller 180 stops rendering the current content when the next preference point is reached and renders an advertisement(s) instead. The frequency of these preference points can vary by content as well as within content. For example, certain portions of the content may have preference points identified for every 30-second portion, while other portions may have preference points identified for every 60-second portion.

Various modifications can also optionally be included in client system 102 for rendering advertisements. In one implementation, multiple different forms of the media content are available from the same or different sources. These different forms vary in the number of advertisements—one form may have lots of advertisements, another form may have a few advertisements, and another form may have no advertisements. Which form the user views can be selected by the user and can vary based on the amount the user pays to view the content. For example, a user who pays a little bit may be able to view the form with a few advertisements, while a user paying more would be able to view the form with no advertisements, and a user paying nothing would be able to view the form with lots of advertisements. Access to particular forms can be restricted to only those users who pay the requisite amount in a variety of manners, such as a password system, by passing a decryption key to client systems 102 of users who pay the requisite amount so that the systems 102 can decrypt the encrypted content, etc.

Additionally, controller 180 may modify the threshold amount of time that should occur between commercials based on the manner in which the media content is rendered. In some situations, client system 102 may allow for the playback of the media content to be slowed down or speeded up (e.g., a user may select to playback the multimedia content at a speed 25% faster than the "normal" playback speed and thus playback the content in a shorter amount of time). In such situations, controller 180 correspondingly alters the threshold amount of time (e.g., reduce the amount of time that should occur between commercials by 25%).

Alternatively, advertisement controller 180 may employ different methods to ensure that commercials are rendered by client system 102. By way of example, controller 180 may communicate with other components in client system 102 to ensure that skip or fast forward controls are not operational during commercials. This can be accomplished, for example, by communicating with a user interface component to identify when the user interface component should accept the skip or fast forward inputs. The user interface component would then simply ignore any skip or fast forward inputs until informed by controller 180 that it is once again acceptable to receive skip or fast forward inputs.

Various additional modifications can be made to these advertising methods. For example, the frequency of advertisements can vary for different media content (e.g., advertisements may occur every fifteen minutes for one movie but only every thirty minutes for another move). Additionally, the time and/or day of the viewing of the media content may alter the frequency and/or number of advertisements (e.g., advertisements may occur more frequently during evening hours than during morning hours, or certain days may be "free" days during which no advertisements are rendered).

Furthermore, a point system may be established in which a user accumulates points for watching an advertisement. The number of points per advertisement can vary (e.g., based on a perceived importance to the advertiser, based on the length of the advertisement, based on the time of day or the day that the advertisement is rendered, based on the media content corresponding to the advertisement, etc.). Accumulated points can then be "redeemed" in a variety of different manners (e.g., in exchange for certain goods and/or services, such as rendering of an advertisement-free movie).

Figure 8:
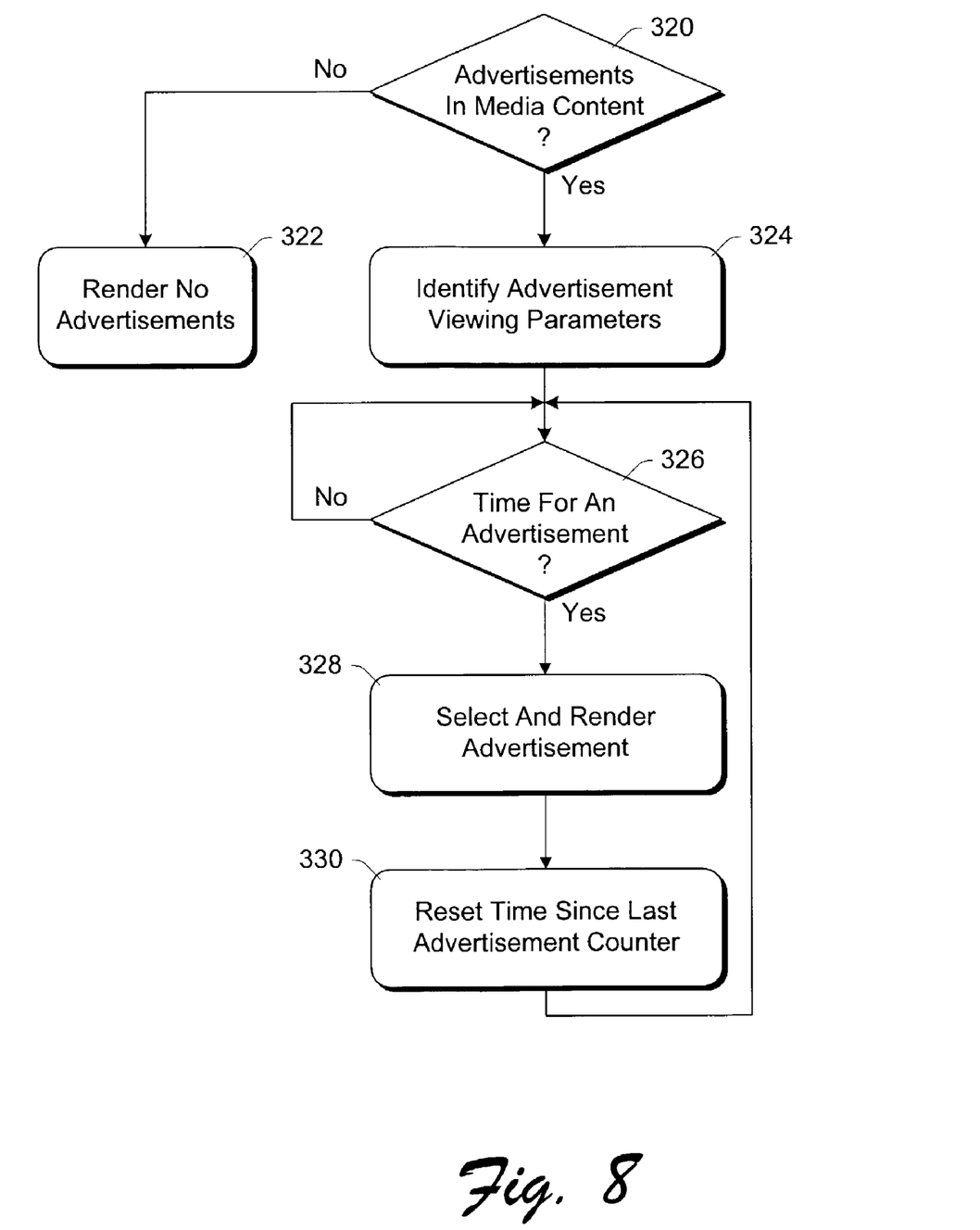
FIG. 8 is a flowchart illustrating an exemplary process for rendering advertisements in accordance with certain embodiments of the invention.

FIG. 8 is a flowchart illustrating an exemplary process for rendering advertisements in accordance with certain embodiments of the invention. The process of FIG. 8 is carried out by a client system 102, and may be implemented in software.

Initially, a check is made as to whether advertisements are to be included in the media content being rendered (act 320). Advertisements may not be included, for example, if the user has paid the requisite fee, has accumulated enough points, if it is a "free" day, etc. If there are not to be any advertisements included in the media content, then no advertisements are rendered (act 322). However, if there are advertisements to be rendered, advertisement viewing parameters are identified (act 324). The advertisement viewing parameters identify, for example, a threshold amount of time that should not be exceeded between advertisements. A check is then made as to whether it is time for an advertisement, based on whether the threshold amount of time since the last advertisement has elapsed (act 326). When it is time for an advertisement, the system selects and renders an advertisement (act 328), resets the time since last advertisement counter (act 330), and returns to check whether it is time for an advertisement (act 326).

Figure 9:
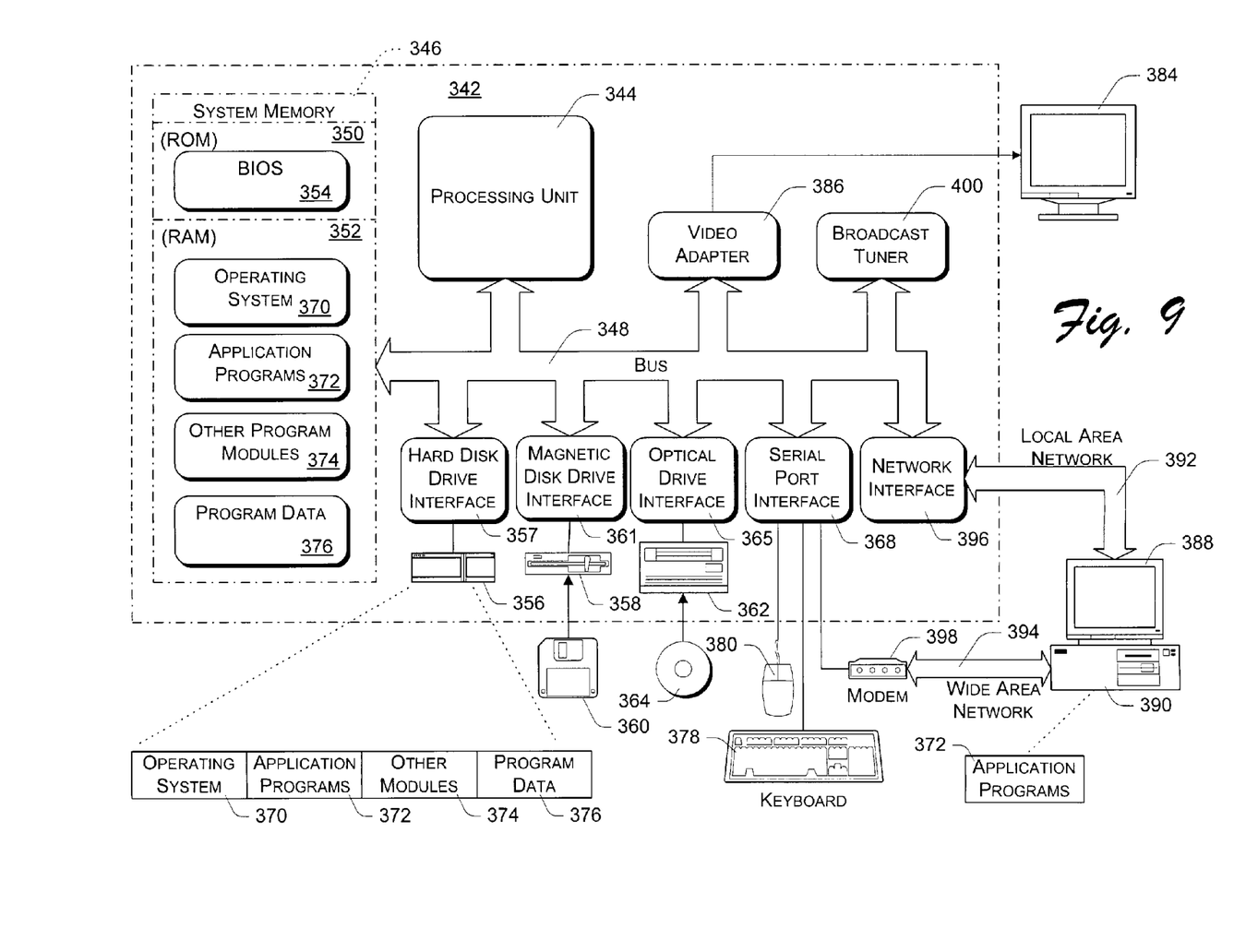
FIG. 9 illustrates an example of a suitable operating environment in which the invention may be implemented.

FIG. 9 illustrates an example of a suitable operating environment in which the invention may be implemented. The illustrated operating environment is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics (e.g., digital video recorders), Internet appliances, gaming consoles, cellular telephones, network PCs, minicomputers, mainframe computers, distributed computing environments that include any of the above systems or devices, and the like.

FIG. 9 shows a general example of a computer 342 that can be used in accordance with the invention. Computer 342 is shown as an example of a computer in which various embodiments of the invention can be practiced, and can be, for example, a client 102 of FIG. 1 or one of servers 102, 122, 126, 128, or 130 of FIG. 1. Computer 342 includes one or more processors or processing units 344, a system memory 346, and a bus 348 that couples various system components including the system memory 346 to processors 344.

The bus 348 represents one or more of any of several types of bus structures, including a memory bus or memory controller, a peripheral bus, an accelerated graphics port, and a processor or local bus using any of a variety of bus architectures. The system memory 346 includes read only memory (ROM) 350 and random access memory (RAM) 352. A basic input/output system (BIOS) 354, containing the basic routines that help to transfer information between elements within computer 342, such as during start-up, is stored in ROM 350. Computer 342 further includes a hard disk drive 356 for reading from and writing to a hard disk, not shown, connected to bus 348 via a hard disk drive interface 357 (e.g., a SCSI, ATA, or other type of interface); a magnetic disk drive 358 for reading from and writing to a removable magnetic disk 360, connected to bus 348 via a magnetic disk drive interface 361; and an optical disk drive 362 for reading from and/or writing to a removable optical disk 364 such as a CD ROM, DVD, or other optical media, connected to bus 348 via an optical drive interface 365. The drives and their associated computer-readable media provide nonvolatile storage of computer readable instructions, data structures, program modules and other data for computer 342. Although the exemplary environment described herein employs a hard disk, a removable magnetic disk 360 and a removable optical disk 364, it will be appreciated by those skilled in the art that other types of computer readable media which can store data that is accessible by a computer, such as magnetic cassettes, flash memory cards, random access memories (RAMs), read only memories (ROM), and the like, may also be used in the exemplary operating environment.

A number of program modules may be stored on the hard disk, magnetic disk 360, optical disk 364, ROM 350, or RAM 352, including an operating system 370, one or more application programs 372, other program modules 374, and program data 376. A user may enter commands and information into computer 342 through input devices such as keyboard 378 and pointing device 380. Other input devices (not shown) may include a microphone, joystick, game pad, satellite dish, scanner, or the like. These and other input devices are connected to the processing unit 344 through an interface 368 that is coupled to the system bus (e.g., a serial port interface, a parallel port interface, a universal serial bus (USB) interface, etc.). A monitor 384 or other type of display device is also connected to the system bus 348 via an interface, such as a video adapter 386. In addition to the monitor, personal computers typically include other peripheral output devices (not shown) such as speakers and printers.

Computer 342 operates in a networked environment using logical connections to one or more remote computers, such as a remote computer 388. The remote computer 388 may be another personal computer, a server, a router, a network PC, a peer device or other common network node, and typically includes many or all of the elements described above relative to computer 342, although only a memory storage device 390 has been illustrated in FIG. 9. The logical connections depicted in FIG. 9 include a local area network (LAN) 392 and a wide area network (WAN) 394. Such networking environments are commonplace in offices, enterprise-wide computer networks, intranets, and the Internet. In certain embodiments of the invention, computer 342 executes an Internet Web browser program (which may optionally be integrated into the operating system 370) such as the "Internet Explorer" Web browser manufactured and distributed by Microsoft Corporation of Redmond, Wash.

When used in a LAN networking environment, computer 342 is connected to the local network 392 through a network interface or adapter 396. When used in a WAN networking environment, computer 342 typically includes a modem 398 or other means for establishing communications over the wide area network 394, such as the Internet. The modem 398, which may be internal or external, is connected to the system bus 348 via a serial port interface 368. In a networked environment, program modules depicted relative to the personal computer 342, or portions thereof, may be stored in the remote memory storage device. It will be appreciated that the network connections shown are exemplary and other means of establishing a communications link between the computers may be used.

Computer 342 also includes a broadcast tuner 400. Broadcast tuner 400 receives broadcast signals either directly (e.g., analog or digital cable transmissions fed directly into tuner 400) or via a reception device (e.g., via antenna or satellite dish).

Computer 342 typically includes at least some form of computer readable media. Computer readable media can be any available media that can be accessed by computer 342. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computer 342. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as wired network or direct-wired connection, and wireless media such as acoustic, RF, infrared and other wireless media. Combinations of any of the above should also be included within the scope of computer readable media.

The invention has been described in part in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

For purposes of illustration, programs and other executable program components such as the operating system are illustrated herein as discrete blocks, although it is recognized that such programs and components reside at various times in different storage components of the computer, and are executed by the data processor(s) of the computer.

Alternatively, the invention may be implemented in hardware or a combination of hardware, software, and/or firmware. For example, one or more application specific integrated circuits (ASICs) could be designed or programmed to carry out the invention.

CONCLUSION

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method in a computing device of rendering portions of a television program that was previously recorded, the method comprising:
   receiving meta data corresponding to the television program, wherein the meta data includes:
      comments, and
      for each comment, an identification of a portion within the television program to which the comment applies, the identification of a portion being an offset from a synchronization point after the beginning of the television program that serves as a common reference location for offsets among different versions of the television program, the synchronization point being specified by a broadcaster of the television program,
      the meta data having been provided by first viewers of the television program, the meta data being organized into sets of meta data for the television program;
   providing access rights of a plurality of second viewers to the sets of meta data for the television program, some of the second viewers not being the broadcaster of the television program and not entitled to access all sets of the meta data; and
   providing recordings of different versions of the television program;
   for each of the plurality of second viewers,
      selecting a set of meta data that the second viewer is entitled to access as indicated by provided access rights;
      receiving from the second viewer input search criteria relating to the television program;
      searching by the computing device the selected set of meta data to identify comments of the selected set of meta data that satisfies the input search criteria;
      for each identified comment, selecting the portion of a recorded version of the television program to which the identified comment applies as indicated by the received meta data and the synchronization point; and
      rendering to the second viewer the selected portions of the recorded version of the television program as a rendering that is separate from the renderings for other second viewers and as a rendering that includes only the selected portions
   so that each second viewer can view a customized, different, and separate rendering of a recorded version of the television program based on their input search criteria and the selected set of meta data provided by a first viewer of the television program that the second viewer is entitled to access.

2. The method of claim 1 wherein the access rights are based on subscription fees paid by the second viewers.

3. The method of claim 1 wherein the television program is received separately from the meta data.

4. The method of claim 1 wherein one version of the television program is an initial broadcast of the television program and another version of the television program is a recorded version of the television program.

5. The method of claim 1 wherein different first viewers provide meta data based on viewing different versions of the television program.

6. The method of claim 1 wherein advertisements are inserted when rendering the selected portions.

7. A computer-readable storage device containing computer-executable instructions for controlling a computing device to render portions of a video that was previously recorded, by a method comprising:
   receiving meta data corresponding to the video, wherein the meta data includes:
      comments, and
      for each comment, an identification of a portion within the video to which the comment applies, the identification of a portion being an offset from a synchronization point after the beginning of the video that serves as a common reference location for offsets among different versions of the video, the synchronization point being specified by an author of the video,
      the meta data having been provided by first viewers of the video, the meta data being organized into sets of meta data for the video;
   providing access rights of a plurality of second viewers to the sets of meta data for the video, some of the second viewers not being an author of the video and not entitled to access all sets of the meta data; and
   providing a recording of different versions of the video;
   for each of the plurality of second viewers,
      selecting a set of meta data that the second viewer is entitled to access as indicated by provided access rights;
      receiving from the second viewer input search criteria relating to the video;
      searching by the computing device the selected set of meta data to identify comments of the selected set of meta data that satisfies the input search criteria;
      for each identified comment, selecting the portion of a recorded version of the video to which the identified comment applies as indicated by the received meta data; and
      rendering to the second viewer the selected portions of the recorded version of the video as a rendering that is separate from the renderings for other second viewers.

8. The computer-readable storage device of claim 7 wherein the access rights are based on subscription fees paid by the second viewers.

9. The computer-readable storage device of claim 7 wherein the video is received separately from the meta data.

10. The computer-readable storage device of claim 9 wherein different first viewers provide meta data based on viewing different versions of the television program.

11. The computer-readable storage device of claim 10 wherein advertisements are inserted when rendering the selected portions.

* * * * *